United States Patent
Joshi et al.

(10) Patent No.: US 7,791,657 B2
(45) Date of Patent: Sep. 7, 2010

(54) DYNAMIC RANGE ENHANCEMENT SCHEME FOR IMAGERS

(75) Inventors: Atul Joshi, Thousand Oaks, CA (US); David Chiaverini, Irvine, CA (US); Vincent Douence, Thousand Oaks, CA (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 585 days.

(21) Appl. No.: 11/716,201

(22) Filed: Mar. 7, 2007

(65) Prior Publication Data

US 2008/0218614 A1    Sep. 11, 2008

(51) Int. Cl.
H04N 5/225 (2006.01)
H04N 5/235 (2006.01)

(52) U.S. Cl. .................... 348/262; 348/222.1
(58) Field of Classification Search ........... 348/294, 348/297
See application file for complete search history.

(56) References Cited

U.S. PATENT DOCUMENTS

| | | | |
|---|---|---|---|
| 6,049,246 A | 4/2000 | Kozisek et al. ......... 330/9 |
| 6,603,511 B1* | 8/2003 | Ishida ................ 348/294 |
| 6,606,121 B1* | 8/2003 | Bohm et al. .......... 348/297 |
| 6,741,283 B1* | 5/2004 | Merrill et al. ........ 348/308 |
| 6,831,689 B2* | 12/2004 | Yadid-Pecht .......... 348/297 |
| 6,864,920 B1 | 3/2005 | Kindt et al. ......... 348/308 |
| 7,221,396 B2* | 5/2007 | Lenz ................ 348/297 |
| 7,382,407 B2* | 6/2008 | Cho et al. ............ 348/296 |

* cited by examiner

*Primary Examiner*—Lin Ye
*Assistant Examiner*—Amy Hsu
(74) *Attorney, Agent, or Firm*—Koppel, Patrick, Heybl & Dawson

(57) ABSTRACT

An imaging system implementing a scheme for enhancing the dynamic range of the device. An array of radiation detecting pixels produces an output in response to a stimulus. The signal from each pixel is read once for evaluation. If the voltage at an individual pixel satisfies a programmed condition, such as exceeding a predetermined threshold voltage at a particular time, that pixel is reset and begins producing an output signal anew. If the pixel output signal does not satisfy the condition, it is allowed to continue producing the signal without being reset. After the evaluation read, all of the pixels are then read row by row into a buffer and digitally processed. A memory register tracks which pixels have been reset, and the corresponding output signals are adjusted accordingly. This scheme allows the system to process input signals across a broader range of intensity without losing information due to pixel saturation or sacrificing sensitivity.

43 Claims, 6 Drawing Sheets

DYNAMIC RANGE ENHANCEMENT SCHEME FOR IMAGERS

BACKGROUND OF THE INVENTION

1. Field of the Invention

The invention relates to imaging devices and, more particularly to imaging devices with enhanced dynamic range.

2. Description of the Related Art

Imaging systems, especially those in the visible and infrared bands, have many modern applications in various fields including personal digital photography, astronomy, medical imagery, surveillance, security and military target acquisition. Such systems are based on image sensors that convert light into an electrical signal. Light sensing visible imager sensors have become increasingly popular in recent years, especially in digital still cameras and video camcorders. Their popularity has been fueled by the development and availability of new cost-effective image sensor technologies.

Charge-coupled devices (CCD) and complimentary metal-oxide semiconductor (CMOS) are two widely used technologies for fabricating image sensors.

CCDs are an integrated circuit with an array of light-sensitive capacitors that are linked or coupled together. CCD signals require special off-chip processing, which increases the cost of a CCD imaging system.

CMOS image sensors are devices that use complimentary and symmetrical pairs of n-type and p-type field-effect transistors to perform basic logic functions. CMOS technology is used to create microprocessors, microcontrollers, static memory, data converters, amplifiers and other digital and analog circuits. One type of image sensor that can be made using normal CMOS processes is an active pixel sensor (APS). APS imagers include an array of pixels each of which comprise a photodiode to collect the input signal and multiple transistors to buffer and amplify the signal for output.

Although CCD devices currently offer a superior dynamic range, CMOS devices are more cost-effective because they use standard semiconductor processes and offer higher level of integration on a single chip. Due to advantages of CMOS image sensors, they are more desirable for consumer products. However, efforts to make the chips more cost-effective by making them smaller have dramatically shrunk pixel size leading to a much reduced dynamic range and a degradation of CMOS image sensor performance.

Dynamic range is one characteristic of an imager that indicates how well the device captures both the highlights and shadows of a scene. The dynamic range of a pixel is defined as the ratio of the saturation level (the highest useful signal) to the noise floor (the lowest observable signal). The dynamic range of an imaging system is sometimes referred to as the scene dynamic range. This refers to the range between the brightest level of illumination that can be detected and the darkest level of illumination that can be detected. The more sensitive a sensor is, the faster it will reach the saturation level. It is therefore desirable to design a system that can accommodate high sensitivity sensors without sacrificing information due to saturation.

There are several methods that attempt to realize a high sensitivity imager with a high dynamic range. One such method that minimizes information loss entails regulating the pixel integration time. U.S. Pat. No. 6,831,689 to Yadid-Pecht describes a theoretical approach to improving the dynamic range of an imaging system by controlling the integration time of each pixel in a sensor array. The method entails using a decision buffer to provide an indication as to whether the pixel is close to saturation. If the pixel is close to saturation, the pixel is reset and begins integrating again. The reset process may be repeated up to three times per pixel during a single integration period. A digital memory keeps track of all the resets that occurred for each individual pixel. The drawback of this theoretical solution is that the system would have to support and account for several resets per pixel during a single integration/read cycle. This requires several comparisons to be made, necessitating extra memory space and more complex circuitry to process and track the multiple resets. The increased memory and processing demands can decrease the system speed, increase its power and substantially increase cost.

The theoretical approach described above does not fully satisfy the need for a visible imager with an enhanced dynamic range that is, capable of retaining information from the input signal. Furthermore, the reference does not disclose how the theory might be realized.

SUMMARY OF THE INVENTION

Briefly, and in general terms, the invention is directed to imaging devices and methods of improving the dynamic range of such devices. One embodiment of an imaging device according to the present invention comprises the components described below. An array of pixels is connected to produce an output signal in response to a stimulus. The pixels reset in response to a reset signal. A vertical scanner is connected to perform operations on selected rows of pixels in the array. The vertical scanner includes a row read pointer and an evaluation read pointer. A column buffer is connected to compare a sample of each of the pixel output signals to a programmable saturation threshold voltage. A reset signal is triggered upon the satisfaction of a condition based on the comparison of the pixel output signals and the saturation threshold voltage. A memory register is connected to the column buffer to store information related to the comparison of the pixel output signals and the saturation threshold voltage. A horizontal scanner comprising a column read pointer is interfaced with the column buffer.

One embodiment of an imaging system according to the present invention comprises the components described below. An array of pixels produces an output signal in response to an input signal. A vertical scanner is connected to select and perform functions on rows of pixels in the array. The vertical scanner includes a row read pointer and an evaluation read pointer. A column buffer is connected to receive and process the output signals from the pixels. The column buffer samples each of the pixel output signals at least twice during a sampling period. The pixels are selectively reset upon the satisfaction of a condition based on a comparison of the first sample of each of the pixel output signals and a programmable saturation threshold voltage. A horizontal scanner is connected to read the data from the column buffer. The horizontal scanner includes a column read pointer. An output interface circuit is connected to process the signal from the column buffer for display. An output display device is connected to accept data from the output interface circuit and display an image.

One method for enhancing the dynamic range of an imaging system according to the present invention is described below. An array of pixels is exposed to an input signal. An output signal is generated at each pixel in response to the input signal. First and second samples are taken of each pixel output signal over a sampling period. The first sample is compared to a programmable saturation threshold voltage. Each pixel is reset only after the satisfaction of a condition based on the comparison of the first sample of each pixel and the saturation threshold voltage. Each pixel that has been reset is provided gain. Data from the pixel output signals is output to a display.

These and other aspects and advantages of the invention will become apparent from the following detailed description and the accompanying drawings, which illustrate by way of example the features of the invention.

DETAILED DESCRIPTION OF THE INVENTION

Figure 1:
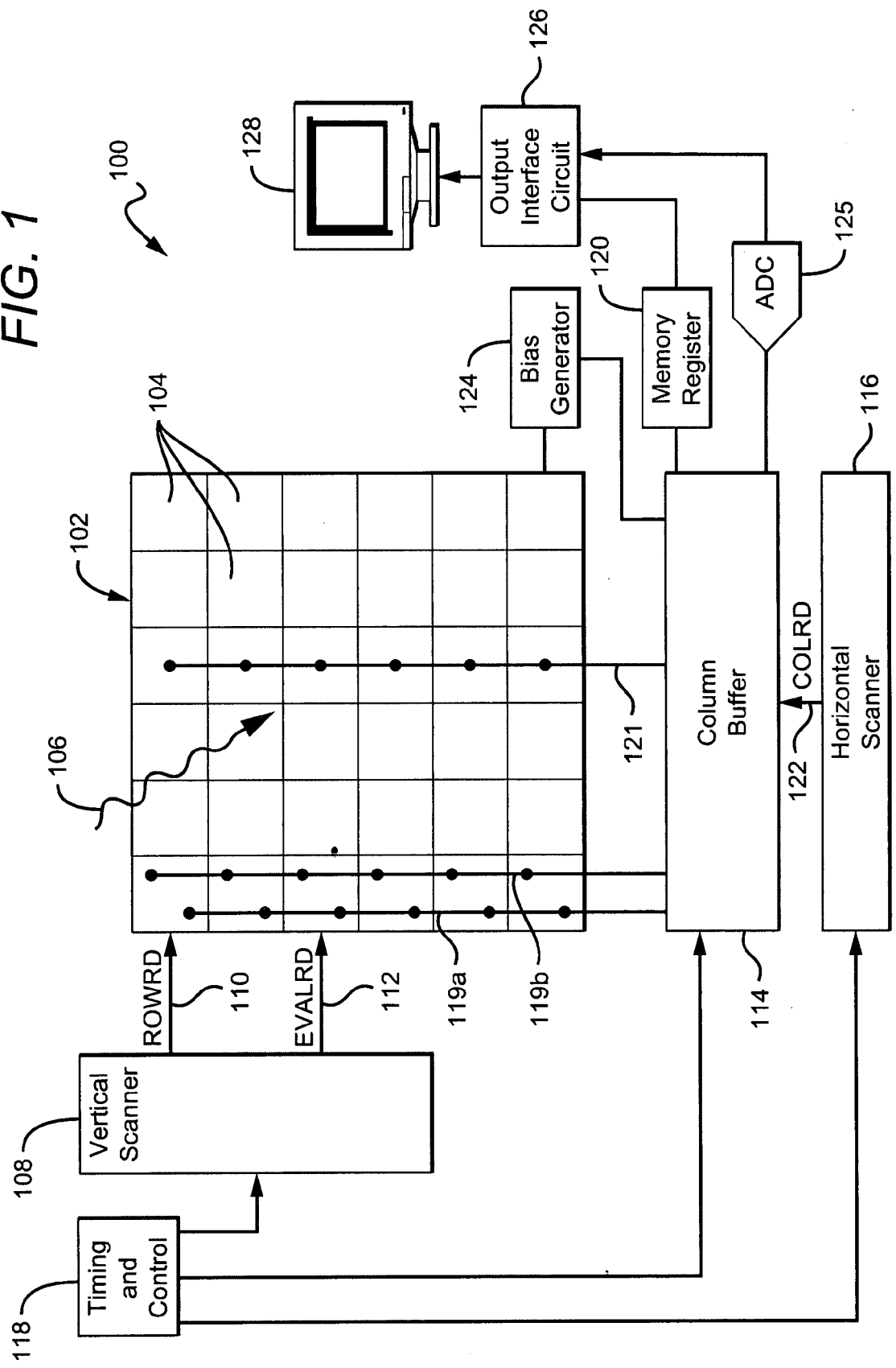
FIG. 1 is a block diagram describing one embodiment of an imaging system according to the present invention.

The present invention provides an imaging system, and more importantly an imaging system that has an enhanced dynamic range. The imaging scheme used by the system is particularly suited for a rolling shutter image processing architecture. The imaging system is designed such that all of the components needed to produce an image signal are located on a single chip, eliminating the need for off-chip processing and reducing associated degradation of performance and increased cost.

The input component of the imaging system comprises an array of sensors that detect radiation within a certain bandwidth, such as the visible spectrum or the infrared spectrum. These sensors, called pixels, can comprise photodiodes, for example. As the rows of pixels within the array are exposed to an incident input signal (e.g., light from an image), they sequentially output a voltage signal that carries information about the intensity of the input signal at each pixel.

Like any detector, the system is limited by the maximum and minimum signals that the pixels can detect. In this case, the pixel output voltage range limits the signal range of the detector. The output is bounded to a range within a maximum voltage called the saturation voltage and a minimum usable voltage. The smallest measurement that can be accommodated by the system is limited by the noise floor, which is the sum of all intrinsic noise sources within a measurement system. The ratio of the output voltage range to the noise floor is defined as the dynamic range of the imaging device.

The present invention as embodied in the claims, improves the dynamic range of an imaging device by preventing the loss of information due to pixel saturation, and thus artificially raising the saturation level. This is achieved by selectively resetting individual pixels when the device anticipates that a pixel will saturate within the sampling or integration period. For convenience, this period is referred to throughout the specification as the integration period, during which time the device is integrating the input signal. The device tracks which pixels have been reset and adds gain to those pixels' output signals to compensate for a shorter integration time due to the reset. By resetting the pixels before saturation, the range of input signals that will result in a meaningful pixel output signal is substantially increased, thus improving the dynamic range.

Another advantage of the present invention as embodied in the claims is the integrability of the devices and methods into different existing architectures and schemes used in the imaging industry. For example, the imaging device as disclosed in the claims may be easily combined with many different types of CMOS active pixel sensors with on chip analog-to-digital converters (ADCs). In the same way, the device may be conveniently combined with other subsystems used in the industry, allowing the designer to use the device in conjunction with many different proprietary systems.

FIG. 1 illustrates an embodiment of an imaging system 100 according to the present invention. An input signal 106, such as the light from an image, is directed onto an array of pixels 102. Individual pixels 104 are sensors, such as photodiodes, capable of detecting radiation within a certain bandwidth. Other sensors that detect radiation outside the visible spectrum may also be used, depending on the nature of the input. The incident input signal 106 creates a current flow that can be integrated into a voltage signal that is related to the flux in each of the pixels. The voltage values can be measured and transmitted as an output signal.

The vertical scanner 108 is connected to the pixel array 102. Horizontal buses (not shown) provide an electrical path for vertical scanner 108 signals to control the timing of the pixel circuitry in each row. Vertical scanner 108 comprises a row read pointer 110 and an evaluation read pointer 112. Evaluation read pointer 112 performs an initial evaluation read on each row of pixels. The data from the evaluation read is sent to the column buffer 114 where it is used to determine which pixels are likely to saturate, necessitating a reset. The evaluation read pointer 112 also functions to send a signal that, when combined with a conditional reset signal from the column buffer 114, resets a particular pixel. When a pixel receives the reset signal it resets its output to zero and begins integrating the signal again. Once the evaluation read and reset sequence is complete for a row, the evaluation pointer 112 moves to the next row and repeats the sequence.

After the evaluation read on a row is complete and selected pixels are reset, row read pointer 110 activates the row of pixels, enabling the pixel data to be read into the column buffer 114. Once the data is read into the column buffer 114, the row read pointer 110 activates and reads the next row in the array 102. The vertical scanner 108 is synchronized with the column buffer 114 and the horizontal scanner 116 with the timing and control circuit 118.

The column buffer 114 is connected to the pixel array via a series of buses running along each column of pixels in the array 102. Each column can be connected to the column buffer with one or multiple column buses. A preferred embodiment includes two buses connecting each pixel of the array 102 to the column buffer 114. Although the column buses are only shown in one column of the array in FIG. 1, it is understood that each column of pixels is connected to the column bus 114 with one or more buses. The dual-bus configuration allows the system to operate using half the bandwidth that would be required if the system was using a single bus.

Each column of pixels has an associated evaluation bus 119a that connects the column to the column buffer 114. When the evaluation read is done, the evaluation bus 119a carries the data from the pixel to the column buffer 114 where it is compared with the saturation threshold voltage. If the pixel requires a reset, the memory register 120 sends a signal back to the pixel array through a vertical reset bus 121. Although only one vertical reset bus 121 is shown, it is understood that the column buffer 114 is similarly connected to each column of the array 102. The reset signal from the vertical reset bus 121 is combined with the evaluation read pointer 112 to reset the desired pixel in the appropriate row.

Each column also has a read bus 119b. The read bus 119b carries the signal associated with the regular row read from the pixel to the column buffer 114. The regular row read happens a specific time after the evaluation read has been performed on that row, allowing for any necessary pixel resets prior to the regular read along with a delay for a short integration period. The buses 119a, 119b can carry signals from different pixels in the same column to the column buffer 114 simultaneously. Thus, the system is capable of evaluating one row and reading a different row at the same time. The dual-bus configuration reduces the bandwidth required to do an evaluation/read cycle to half, which decreases the power consumed by the system and increases the dynamic range due to lower current flow through the source follower. This is discussed in more detail below with reference to FIG. 3.

At a point during the integration period, the column buffer 114 receives a first sample of all of the pixel signals within the row that is being evaluated. The samples are then compared to a tunable reference voltage using a comparator circuit, for example. If the first sample from any given pixel satisfies the comparison condition (e.g., the signal exceeds the threshold voltage), then the column buffer 114 sends a conditional reset signal to the pixel through the vertical reset bus 121 corresponding to the column where the pixel is located, and that pixel is reset. The column buffer 114 tracks those pixels that were reset during the read and stores this information temporarily in an on-chip memory register 120.

The bit stored in the memory register 120 signifying that the pixel was reset, called the gain bit, is combined with the pixel output signals after they are converted from analog to digital signals. When the pixel output signals are sent off-chip for processing, those signals have been corrected for difference in integration time by gaining appropriately the pixels that had a shorter integration time. The gain setting is determined by the time during the integration period when the first sample is taken. It is proportional to the ratio of the long integration time used for the pixels that are not reset to the short integration time used for the pixels that are reset. Multiple gain bits can be used if multiple resets are used. Timing and control circuit 118 synchronizes the column buffer 114 with the vertical scanner 108 and the horizontal scanner 116 to control the different integration times.

The row read pointer 110 activates a pixel in each column to put its signal on column bus 119a during the evaluation read and on column bus 119b during the regular read so that the information may be delivered from the pixels in that column to the column buffer 114 for temporary storage before the data is output for processing. The horizontal scanner 116 is connected to the column buffer 114. The horizontal scanner comprises a column read pointer 122, which is used to address the appropriate column cell to read out the signal from the column buffer into the ADC 125. Timing and control circuit 118 synchronizes the horizontal scanner 116 with the vertical scanner 108 and the column buffer 114.

The bias generator circuit 124 provides bias voltages and currents to various circuit elements in the pixel array 102 and the column buffer 114. The bias generator 124 may also be used to provide bias voltages or currents to other components in the system as well.

The signal from the column buffer 114 is sent on a row-by-row basis through the analog-to-digital converter 125 and then to the output interface circuit 126 where it is combined with information from the memory register 120 indicating whether the signal needs to be gained up. If the signal does include one or more gain bits, then the signal is amplified accordingly. The output interface circuit 126 accepts signals from the column buffer 114 and the memory register 120 and produces a signal that is formatted either for an output device. The output device can comprise a display device 128 or an external capture device. The display device can be a television screen or a computer monitor, and the capture device could be a computer or a data recorder, for example.

Figure 2:
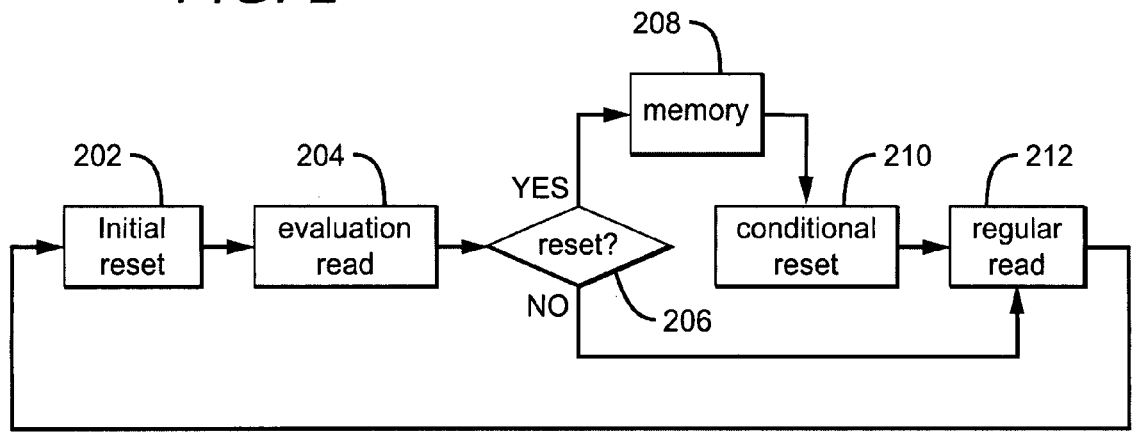
FIG. 2 is flow diagram illustrating a typical row evaluation/reset and read sequence according to one embodiment of the present invention.

FIG. 2 is a flow chart that illustrates a typical row evaluation/reset and read sequence. Before a row of pixels can integrate new signal, it must be cleared of any residual signal that might be present on the pixels, necessitating an initial reset 202. After the first integration, the vertical scanner 108 activates a row of pixels and the column buffer 114 performs an evaluation read 204. At this time, the system performs a reset decision 206 where the data from the evaluation read for each pixel is compared to the threshold value using the comparison circuitry in the column buffer 114. If the comparison for a pixel satisfies a programmed condition (e.g., the signal is greater than the threshold value), then a gain bit associated with that particular pixel is stored in the memory 208 and a conditional reset 210 is applied to the pixel. Once the pixel has been reset, it begins integrating again and a regular read 212 is performed at some delay after the reset. If the condition is not satisfied, then the pixel continues normally integrating and the system performs a regular read 212 at the specified time. After the row has been read, it is then finally reset and the sequence begins again with an initial reset 202.

Several methods can be used to generate a manageable pixel output signal. One such method, as discussed above, is to integrate the pixel current with an integrating amplifier. The amplifier will yield a signal whose slope is proportional to the flux at the pixel. Because the flux at the pixel is typically constant during the frame time, a plot of voltage versus time at the amplifier output will be linear (i.e. the slope is constant). If the input flux is high enough, the pixel will saturate and no additional current will be generated. If this happens the output signal from the amplifier is no longer proportional to the flux, and the signal carries no meaningful information.

Although several different methods can be used to generate a pixel output signal, the preferred method is to use an integrating means. Using this method, the output signal varies linearly while the noise varies sub-linearly. This substantially improves the signal-to-noise (SNR) ratio.

Figure 3:
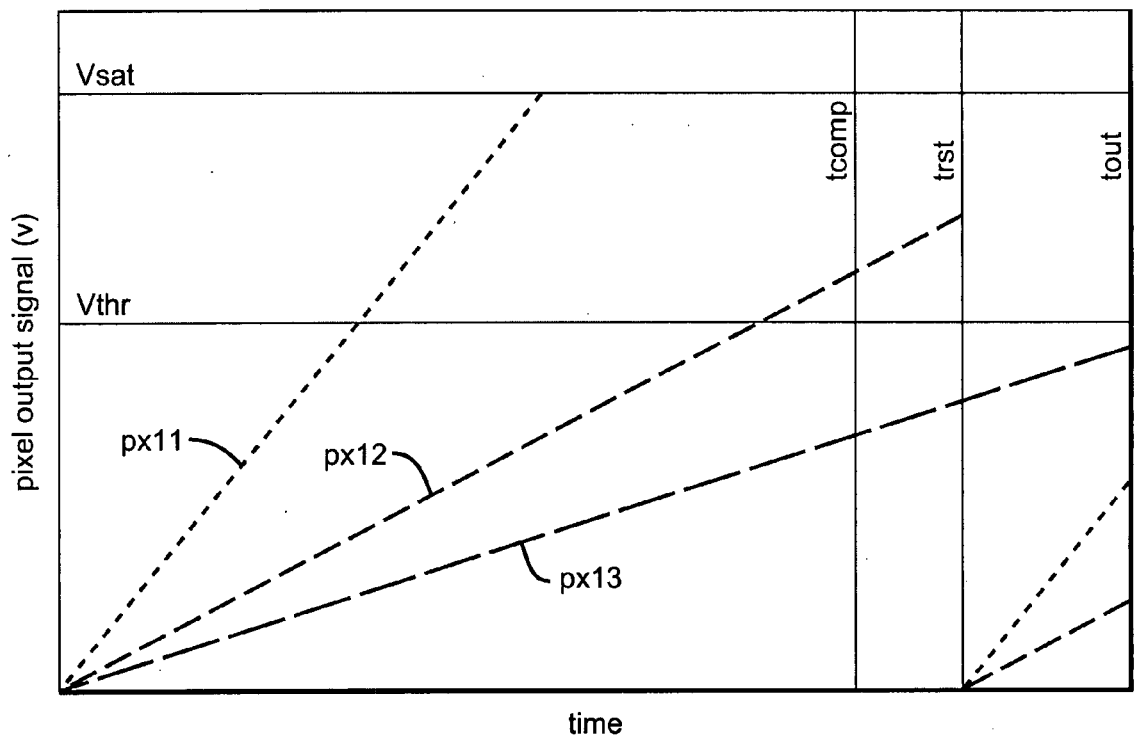
FIG. 3 is graph of pixel output signal as a function of time modeling three different pixel integration scenarios according to the present invention.

FIG. 3 is a graph that models typical pixel output voltages as a function of time. This particular model uses an integrating amplifier that is integrating holes, yielding a positively sloping output voltage. A circuit integrating electrons would look similar except it would have a negative slope. Two important voltage levels are shown on the graph: Vsat and Vthr. Vsat represents the voltage at which the pixels are saturated. When the flux is high enough at a pixel, the output voltage will reach Vsat and level off regardless of any additional flux that the pixel sees. Thus, when the Vsat level is exceeded the pixel output signal is no longer related to the flux at the pixel.

In order to prevent pixel saturation and the resulting loss of information, the column buffer 114 takes a first sample of the pixel output signal at time tcomp to determine if the pixel will saturate during the integration period. This determination is made by comparing the pixel output voltage to a tunable threshold voltage, shown as Vthr in FIG. 3. Vthr is easily adjustable. If the pixel is configured for positive integration (as shown in FIG. 3), then the threshold voltage is a maximum voltage and a reset will only be triggered when the pixel output voltage exceeds the threshold value. Various types of amplifiers may be used while retaining the same dynamic range enhancement scheme, such as source followers, capacitive trans-impedance amplifiers (CTIAs) or direct injection amplifiers (DI). Also, using an amplifier that integrates downwards due to integration of electrons, the threshold voltage would be a minimum value and a reset would only be triggered if the pixel output voltage fell below the threshold.

The input signal is integrated in the normal fashion for some fraction of a frame, such as 90%. Assuming this example, the signal is integrated for 9/10 of the total time allotted to read a row at which point the column buffer 114 samples the pixel output voltage and compares it to the externally controlled threshold voltage. If the value of the pixel output voltage (which may be level-shifted and linearized to match the value inside the pixel) exceeds the threshold voltage, the comparator flips and outputs a digital high bit (i.e, "one"). The information is then stored in the memory register 120. This process may be completed simultaneously for each pixel in a row. This approach minimizes the required memory since only one bit per pixel for only 10% of the pixels needs to be stored if the evaluation read is done after 90% of integration. In addition, it allows for full frame integration of pixels below threshold, maximizing the response of low signals.

During the next row sequence, the row that was just evaluated receives the data from the memory register 120 which is fed back through the vertical reset bus 121. If the memory register 120 sends back a one and the vertical scanner 108 row reset signal is a one, then the pixel resets. Thus, the pixel reset function is x-y selectable. Once a pixel is reset, it immediately begins integrating for the remaining 10% of the frame time. At the end of the frame time the signals from all the pixels in a row are read into the column buffer 114. After the normal read the pixel is again reset, and the cycle starts again.

The determination for conditional reset is made for each pixel individually or for an entire row of pixels; it is not a global decision. The data for each pixel contains a 12-bit digital value plus any gain bits. The gain bits can be sent as an exponent along with the ADC data as a mantissa in the floating point notation to minimize processing on the chip. Alternatively, the data can be converted into integer notation using a multiplier on the chip. The gain bits set the gain by a factor that is determined according to the following equation where trst is the integration time for the pixel reset during the frame and tout is the total integration time for one pixel:

$$\frac{tout}{tout - trst}.$$

Thus, the gain is proportional to the ratio of the total pixel integration time for a non-reset pixel to the shorter integration time for a pixel that was reset during the frame integration. This imaging scheme allows small signals to be integrated for a full frame on a small capacitor providing high sensitivity, whereas large signals are integrated for a short time while retaining the information that would have been lost had the pixel been allowed to saturate. For example, a pixel with a 1fF integration capacitance and a 1.5V swing would saturate with a signal of 10,000 electrons signal. If the readout chain noise was 500 μV, the effective dynamic range at room temperature would be 720, assuming no correlated double sampling (CDS) is used in the imager, and 3000, assuming CDS is used. For a 10fF integration capacitance these dynamic range numbers increase to 1850 and 3000, respectively. However, if the proposed high dynamic range scheme is used on the 1fF integration capacitance pixel, applying a reset after 90% of the integration time, the dynamic ranges would increase to 7200 and 30,000, respectively. The smaller integration capacitance pixel has lower noise for a smaller signal, but it saturates earlier. By applying the dynamic range improvement scheme, the noise is kept low for the low signals but the effective saturation level increases.

It is noted that the scheme improves the signal to noise ratio (SNR) for lower signals while reducing the SNR for higher signals. However, this tradeoff is not an issue for many applications as the advantages of added flexibility outweigh the reduction in SNR for higher signals. In the example mentioned above, the SNR for lower signals is improved by up to ten times by using a high dynamic range 1fF pixel instead of a 10fF pixel. At the same time the SNR decreases by three times for signals higher than 10,000 electrons. But since the SNR is already quite good for high signals it never drops below thirty. Thus, the scheme provides the advantages of being able to detect small signals while maintaining reasonable quality for high signals.

FIG. 3 illustrates an example of output signals from three different typical pixels during one integration time, assuming the mode of operation described above. The first exemplary pixel output signal ("pxl1") reaches the threshold voltage Vthr before the first sample is taken at time tcomp. The pixel then reaches the saturation voltage Vsat and levels off. After pxl1 reaches Vsat, its signal no longer carries useful information about the flux at pxl1. Because pxl1 equals Vsat (which is greater than Vthr) at time tcomp, the pixel is reset at the designated reset time trst. After pxl1 is reset, it immediately begins integrating again for the remainder of the integration period. At time tout the output signal is sampled again and the information is sent to the column buffer 114. Because pxl1 requires a reset, the sample taken at tout will be gained up in the output interface circuit 126 by a factor that is proportional to the ratio tout/(tout−trst).

The second exemplary pixel output signal ("pxl2") exceeds Vthr prior to tcomp. The signal is reset at trst similar to pxl1. The reset occurs even though pxl2 never reaches Vsat during the integration period as indicated by the extrapolation of pxl2 (shown as cross-hashed line). After the reset, pxl2 begins integrating again and the final sample is taken at tout and later gained up in the output interface circuit 126. Thus, as pxl2 illustrates, pixels may be reset even when they would yield a meaningful output signal if allowed to integrate for the full period. This may be done to create a small buffer zone for pixels that will be very near saturation at the end of the integration period, ensuring that none of the pixels that avoided the reset will saturate before tout.

The third exemplary pixel output signal ("pxl3") is less than Vthr at tcomp. Thus, the pixel does not reset and is allowed to integrate for the entire period. The signal is finally sampled at tout, and the data is sent to the column buffer 114.

It is understood that FIG. 3 is a model of pixel output voltages included for illustrative purposes only. FIG. 3 is not compiled from actual measurements, is not drawn to scale, and is not meant to limit the device in any way.

Figure 4:
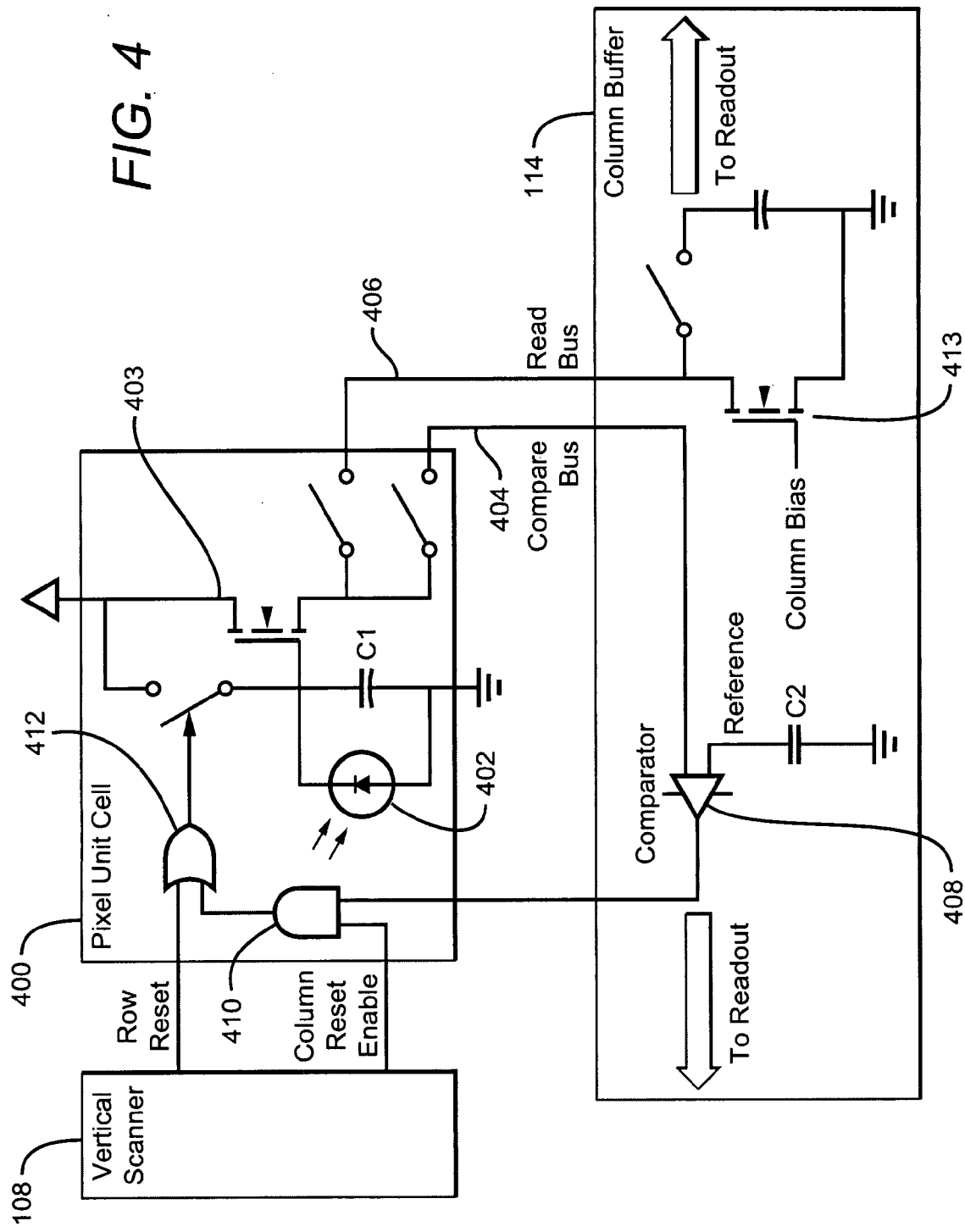
FIG. 4 is a circuit diagram that shows generally some of the circuit elements comprising the imaging device according to one embodiment of the present invention.

FIG. 4 is a circuit diagram that shows generally some of the circuit elements comprising the imaging device according to one embodiment of the present invention. It is apparent to one of ordinary skill in the art that many different circuit combinations are available to the designer and that the invention is not intended to be limited to any particular circuit solution. A single pixel unit cell 400 is shown connected to the vertical scanner 108 and the column buffer 114. The input signal, an image for example, is incident on the photodiode 402, causing a current to flow through the photodiode 402 and generating a voltage at the capacitor C1. The signal is integrated and amplified with transistor 403 where it is then sent to the column buffer 114 for an evaluation via the evaluation bus 404 or for a regular read via the read bus 406.

During the evaluation read, the signal from the pixel unit 400 is sent to comparator circuit 408 via the evaluation bus 404 where it is compared with the programmable threshold voltage. If the signal is greater than (or less than, if negative integration is used) the threshold voltage, the comparator sends a conditional reset signal to the AND gate 410. If the AND gate 410 receives both the conditional reset signal and a column reset enable signal from the vertical scanner 108 at the same time, then the AND gate 410 outputs a logic high signal. The output of the AND gate 410 is connected to one of the inputs on the OR gate 412. Thus when the OR gate 412 receives either a row reset signal from the vertical scanner 108 or a logic high signal from the AND gate 410, the pixel is reset.

At the end of the row sequence the output signal from the pixel unit 400 is read into the column buffer 114 via the read bus 406. The signal from the pixel unit 400 is temporarily stored in the column buffer 114 at C2 and then sent off-chip for processing using video amplifiers and/or ADCs.

Figure 5:
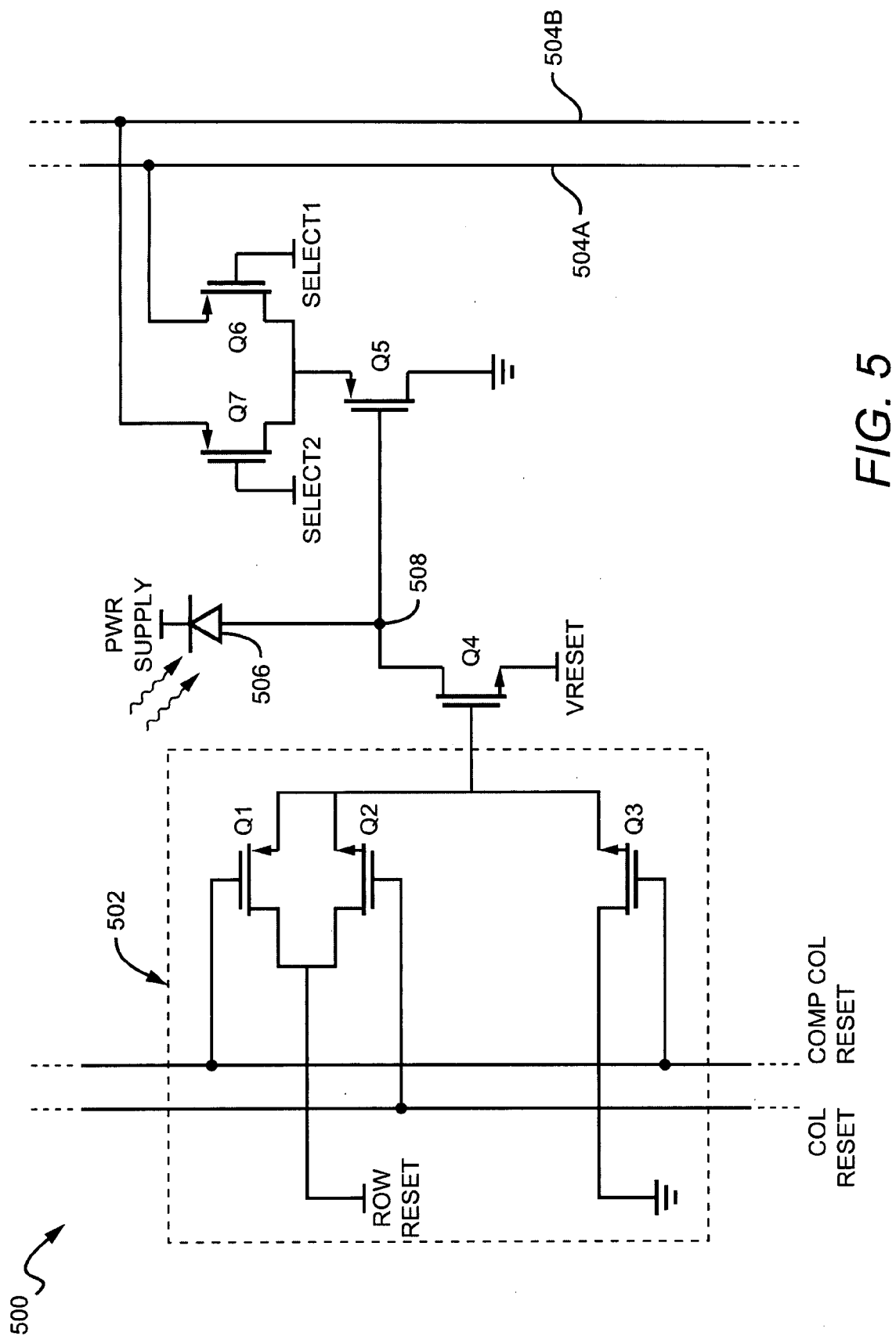
FIG. 5 is a transistor-level schematic of one embodiment of a pixel unit according to the present invention.

FIG. 5 is a transistor-level schematic of a pixel unit 500 according to one embodiment of the present invention. This particular embodiment is a seven-transistor (7-T) solution, comprising p-type field effect transistors (PFETs) and n-type field effect transistors (NFETs). It is known that other types of transistors may be used to achieve the same functionality. A multiplexing (mux) element 502 comprises three transistors Q1, Q2, Q3. Transistor Q4 functions to reset the pixel. Transistor Q5 is configured as a source follower. Transistors Q6 and Q7 provide a switched path to column buses 504a, 504b.

Mux element 502 functions to allow the system to select between an entire row reset or a selectable x-y reset for individual pixels. Q1 and Q2 are connected as a complimentary switch, providing a path for the ROW RESET signal to the gate of Q4. The operation of CMOS complimentary switches is well-known and only briefly discussed below. NFETs such as Q2 work well at the higher end of a voltage range while PFETs such as Q1 work are suited for the lower end of the range. Therefore, the complimentary configuration of Q1 and Q2 allows for the switch to operate over a larger usable voltage range. Q1 is a PFET that is modulated by the complimentary column reset signal COMP COL RESET. Q2 is an NFET that is modulated by the column reset signal COL RESET. Q3 is an NFET that is modulated by COMP COL RESET. In combination Q1, Q2 and Q3 function as an AND gate, corresponding to AND gate 410 shown in FIG. 4. The output of the AND gate is connected to the gate of NFET Q4. FIG. 4 also shows OR gate 412. In the embodiment shown in FIG. 5, the OR gate function is implicit in the way the mux is operated. For a full row reset all COL RESET signals are enabled while for a pixel x-y reset only the columns requiring reset are enabled. This mux circuit is an elegant implementation that uses only three transistors where eight transistors would be required for a traditional AND/OR gate combination. Keeping circuit components to a minimum reduces pixel size, resulting in a more cost-effective fabrication process.

Q4 provides a path from the reset voltage VRESET to the photodiode 506. In this embodiment photodiode 506 is a P-on-N type detector. The photodiode 506 is connected between the power supply PWR SUPPLY and the drain of Q4 with positive side of the photodiode 506 common with the drain of Q4. The signal from the mux element 502 modulates Q4, selectively connecting photodiode 506 to VRESET and resetting the pixel. An integration node 508 is defined by the junction of the positive terminal of photodiode 506, the source of Q4 and the gate of PFET Q5. Q5 is configured as a source follower with its drain grounded and its source connected to the drain electrodes of PFETs Q6 and Q7.

Q6 and Q7 are configured as a selectable switch. The switch provides a current path from Q5 through Q6 and Q7 to column buses 504a, 504b, respectively. Q6 is modulated by signal SELECT1. SELECT1 controls the flow of current through Q6 to column bus 504a. Likewise, signal SELECT2 modulates Q7. Column buses 504a, 504b carry the signal from the pixel 500 to the column buffer 114 (not shown in FIG. 5). Q6 and Q7 can both be replaced with complimentary switches similar to the complimentary switch in the mux element 502 if a higher voltage swing is desired. They can also be replaced by a single switch which time sequences the two reads rather than doing them in parallel.

This particular embodiment utilizes the parasitic capacitance of the elements already present in the circuit to temporarily store the signal from the photodiode 506 as it is integrating. However, if a particular application requires a larger charge capacity, then other means of storage such as capacitors may be employed. One such approach is illustrated in FIG. 6 as discussed below.

It is understood that the same function can be performed with circuits having six and even as few as five transistors. For example, a five-transistor solution can be realized by removing one of the transistors in the complimentary switch in the mux element and one of the transistor-column bus paths. Additional transistors and components may also be used for various functions without deviating from the basic structure and spirit of the invention. The preferred embodiment, however, is the 7-T model discussed above.

Figure 6:
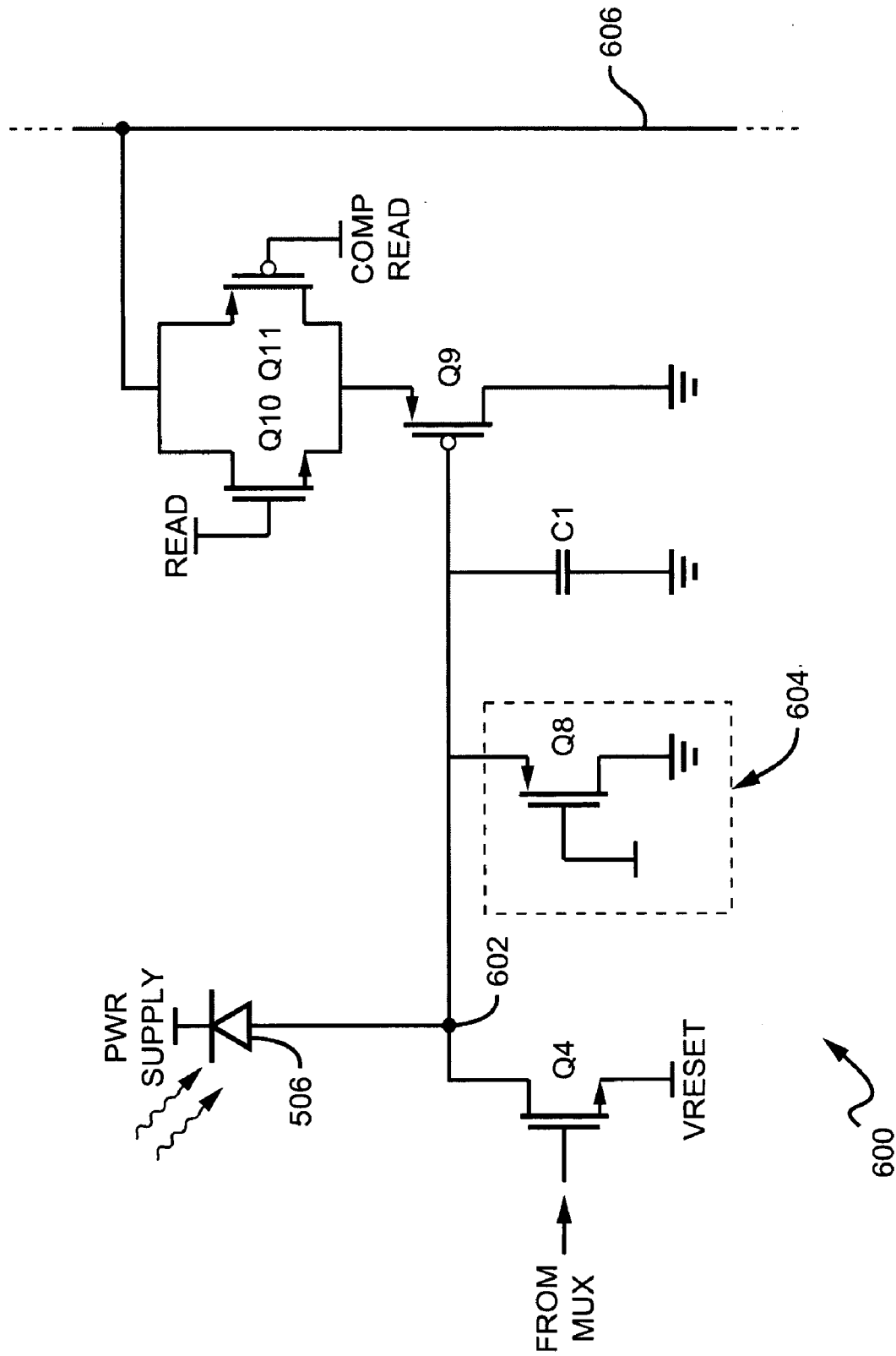
FIG. 6 is a transistor-level schematic of one embodiment of a pixel unit according to the present invention.

FIG. 6 is a transistor-level schematic of a pixel unit 600 according to another embodiment of the present invention. Several optional features are shown in FIG. 6, and it is understood that the invention may embody different combinations of these features to meet a specific design need. The input arrow on the far left of FIG. 6 indicates that the signal comes from a mux element (not shown) that is identical to the mux element 502 shown in FIG. 5.

The signal from the mux element modulates the reset transistor Q4, selectively connecting the positive end of the photodiode 506 to VRESET in order to reset the pixel as discussed above. In this embodiment the integration node 602 is defined by the common connection of the drain of Q4, the source of PFET Q8, the non-grounded terminal of capacitor C1 and the gate of PFET Q9.

An anti-blooming element may be used as a sink for overflow current resulting from saturation of the photodiode 506. The element is biased with a predetermined voltage. When the voltage at the integration node 602 exceeds a selected level the element provides a path to ground for the overflow current, clamping the voltage at the integration node to a selected value. In this particular embodiment, Q8 is connected between the integration node 602 and ground. Signal OVERFLOW modulates Q8, providing the necessary release path when overflow conditions are present. OVERFLOW may be set according to the operating parameters of the system by selecting the gate voltage of Q8. Other types of anti-blooming elements may also be used, such as a diode.

Capacitor C1 (also shown in FIG. 4) provides charge storage for the signal integration. As discussed above, it is often advantageous to use the parasitic capacitance of the elements already present in the 7-T model to achieve the integration. However, if a larger charge capacity is necessary then a capacitor can be connected between the integration node 602 and ground as shown. The capacitor can be realized with a FET, a metal-insulator-metal (MIM) module, a poly-poly cap or through other means.

The signal at the integration node 602 drives PFET Q9. Q9 includes an inverter at its gate. The drain of Q9 is connected to ground. The source of Q9 is connected to the CMOS selectable switch comprising NFET Q10 and PFET Q11. The operation of CMOS switches is well known. The switch provides a means to select a path from Q8 to the column bus 606. Complimentary signals READ and COMP READ modulate Q10 and Q11, respectively. This improves the swing of the signal path. Although a single column bus 606 is used in this embodiment, multiple buses can be used as illustrated in FIG. 5.

FIGS. 5 and 6 show systems that use P-on-N type detectors. However, N-on-P type detectors may also be used. When using N-on-P detectors, all of the PFETs must be replaced by NFETs and vice versa. And, of course, the polarity of the diode will be opposite from those shown in the figures. Otherwise, the operation of the pixel unit is basically the same regardless of whether P-on-N or N-on-P detectors are used.

Some typical part values and dimensions for the components shown in FIGS. 5 and 6 are listed below using thick gate oxide FETs in a typical 0.13 µm, 0.18 µm or 0.25 µm CMOS process:

normal transistors:
 Q width=0.7 µm
 Q length=0.35 µm source follower transistors:
 Q width=2.1 µm
 Q length=0.7 µm C1=10fF or 100fF photodiode=2 µm×2 µm to 20 µm 20 µm area power supply=3.3V ground=0V voltage at gate of Q8=1.3V bias current for Q5 or Q9=1 µA to 10 µA VRESET=0 to 0.3 V The transistors that are configured as source followers (Q5 in FIG. 5 and Q9 in FIG. 6) have a larger area than the other transistors in the circuit to reduce the flicker noise and improve matching.

Figure 7:
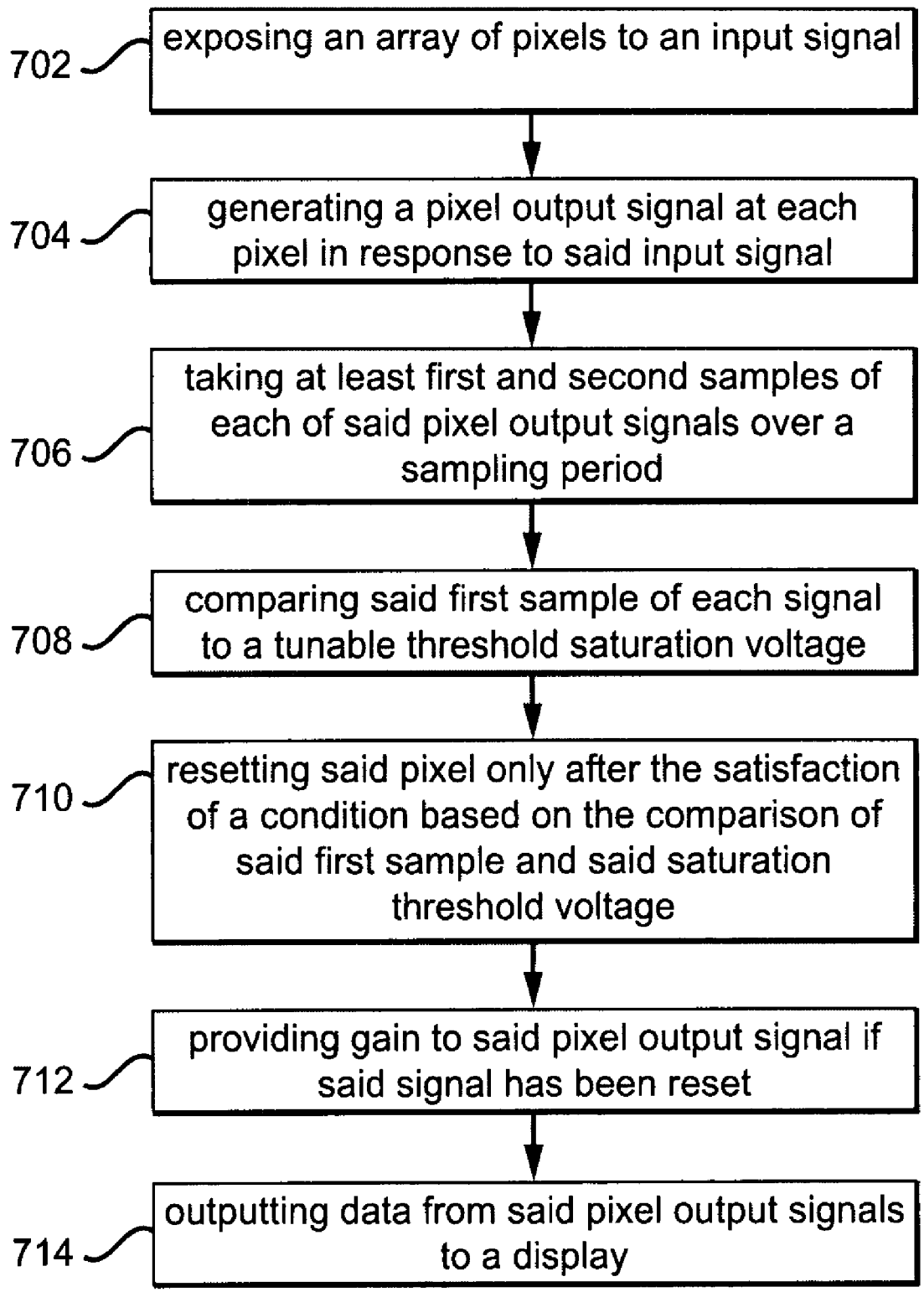
FIG. 7 is a flow diagram illustrating a method for enhancing the dynamic range of an imaging system according to the present invention.

FIG. 7 is a flow diagram illustrating a method for enhancing the dynamic range of an imaging system according to the present invention. An array of pixels is exposed to an input signal as shown in step 702. In response to the input signal, a pixel output signal is generated at each pixel as shown in 704. First and second samples are taken from each of the output signals during a sampling period as shown in 706. The first sample is compared to a programmable saturation voltage as shown in 708. A pixel is reset only after the satisfaction of a condition based on the comparison of the first sample and the programmable saturation voltage as shown in 710. A gain is provided to a pixel if that pixel was reset as shown 712. Finally, the data is output from said pixel to a display as shown in 714.

Although the present invention has been described in detail with reference to certain preferred configurations thereof, other versions are possible. For example, the pixel units described herein can be constructed using any combination of the optional features that were discussed in detail above. The imaging devices described above are only examples of the many different embodiments of imaging devices according to the present invention. Other modifications can be made without departing from the spirit and scope of the invention.

We claim:

1. An imaging device, comprising:
 an array of pixels having rows and columns, each of said pixels connected to produce an output signal in response to a stimulus, each of said pixels connected to reset in response to a reset signal;
 a vertical scanner connected to perform functions on selected rows of pixels within said array, said vertical scanner having a row read pointer and an evaluation read pointer;
 a column buffer, said column buffer connected to compare a sample of each of said pixel output signals to a programmable saturation threshold voltage and to trigger a conditional reset signal upon the satisfaction of a condition based on the comparison of said sample and said saturation threshold voltage;
 a memory register connected to said column buffer to store and transmit information related to the comparison of said pixel output signals and said saturation threshold voltage; and
 a horizontal scanner interfaced with said column buffer, said horizontal scanner comprising a column read pointer;
 wherein each of said pixels further comprises:
  a logic AND gate having said conditional reset signal and a reset enable signal from said evaluation read pointer as the inputs; and
  a logic OR gate having a row reset signal from said row read pointer and the output of said AND gate as inputs;
  wherein the output of said OR gate drives a switch that resets said pixel when said switch is closed.

2. The imaging device of claim 1, further comprising:
 a timing and control circuit connected to said vertical scanner, said horizontal scanner and said column buffer to synchronize operations.

3. The imaging device of claim 1, further comprising:
 a bias generator connected to provide bias signals to components of the imaging device.

4. The imaging device of claim 1, wherein said pixel output signals comprise an integrated signal having a slope that is proportional to the intensity of said stimulus.

5. The imaging device of claim 1, said column buffer further comprising a comparison circuit connected to accept at least first and second data samples from each of said pixel output signals during an integration period and to selectively trigger said conditional reset signal based on a comparison of said first data sample and said saturation threshold voltage.

6. The imaging device of claim 5 wherein said conditional reset signal is triggered when the value of said first data sample is greater than or equal to said saturation threshold voltage.

7. The imaging device of claim 5 wherein said conditional reset signal is triggered when the value of said first data sample is less than or equal to said saturation threshold voltage.

8. The imaging device of claim 1, further comprising:
 an output interface circuit including a gain circuit connected to selectively provide gain to said pixel output signals that have been reset.

9. The imaging device of claim 1, further comprising:
an analog-to-digital (ADC) converter connected to convert analog output from said column buffer to a digital output signal.

10. The imaging device of claim 9 wherein said ADC converter is disposed on-chip.

11. The imaging device of claim 1, each of said pixels comprising an anti-blooming element.

12. The imaging device of claim 11, wherein said anti-blooming device comprises an FET transistor.

13. The imaging device of claim 1, each of said pixels further comprising a capacitor connected to increase the charge capacity of said pixel.

14. The imaging device of claim 1, each of said pixels comprising at least one CMOS switch connected to increase the voltage swing of said pixel.

15. The imaging device of claim 1, wherein each of said pixels comprises seven FET transistors.

16. The imaging device of claim 1, further comprising:
at least first and second buses connecting each column of said pixel array to said column buffer.

17. The imaging device of claim 16, wherein said first bus transmits data from one of said pixels to said column buffer in response to a signal from said evaluation read pointer, and wherein said second bus transmits data from one of said pixels to said column buffer in response to a signal from said row read pointer.

18. An imaging system producing an image in response to an input signal, comprising:
an array of pixels, each of said pixels connected to produce an output signal in response to said input signal;
a vertical scanner connected to select and perform functions on rows of pixels from said array, said vertical scanner having a row read pointer and an evaluation read pointer;
a column buffer connected to receive and process said pixel output signals, said column buffer connected to sample each of said pixel output signals at least twice during a sampling period and to selectively reset said pixels upon the satisfaction of a condition based on a comparison of a first sample of each of said pixel output signals and a programmable saturation threshold voltage;
a horizontal scanner connected to read data from the column buffer, said horizontal scanner having a column read pointer;
an output interface circuit to process data from said column buffer for display; and
an output device connected to accept data from said output interface circuit and display or record an image;
wherein each of said pixels further comprises:
a logic AND gate having said conditional reset signal and a reset enable signal from said evaluation read pointer as the inputs; and
a logic OR gate having a row reset signal from said row read pointer and the output of said AND gate as inputs;
wherein the output of said OR gate drives a switch that resets said pixel when said switch is closed.

19. The imaging system of claim 18, further comprising:
a timing and control circuit connected to said vertical scanner, said horizontal scanner and said column buffer to synchronize operations.

20. The imaging system of claim 18, further comprising:
a bias generator connected to provide bias signals to components of the imaging device.

21. The imaging system of claim 18, wherein said pixel output signals comprise an integrated signal having a slope that is proportional to the intensity of said input signal.

22. The imaging system of claim 18, further comprising:
a gain circuit connected to selectively provide gain to said pixel output signals that have been reset.

23. The imaging system of claim 18, further comprising an analog-to-digital (ADC) converter connected to convert analog output from said column buffer to a digital output signal.

24. The imaging system of claim 23 wherein said ADC is disposed on-chip.

25. The imaging system of claim 18, said column buffer further comprising a comparison circuit connected to compare each of said pixel output signals to said saturated threshold voltage and to reset said pixel when said condition is satisfied.

26. The imaging system of claim 25, wherein said condition is satisfied when the value of said first data sample is greater than or equal to said saturation threshold voltage.

27. The imaging system of claim 25, wherein said condition is satisfied when the value of said first data sample is less than or equal to said saturation threshold voltage.

28. The imaging system of claim 18, further comprising:
at least first and second buses connecting each column of said pixel array to said column buffer.

29. The imaging system of claim 28, wherein said first bus transmits data from one of said pixels to said column buffer in response to a signal from said evaluation pointer, and wherein said second bus transmits data from one of said pixels to said column buffer in response to a signal from said row read pointer.

30. An imaging device, comprising:
an array of pixels having rows and columns, each of said pixels connected to produce an output signal in response to a stimulus, each of said pixels connected to reset in response to a reset signal;
a vertical scanner connected to perform functions on selected rows of pixels within said array, said vertical scanner having a row read pointer and an evaluation read pointer;
a column buffer, said column buffer connected to compare a sample of each of said pixel output signals to a programmable saturation threshold voltage and to trigger a conditional reset signal upon the satisfaction of a condition based on the comparison of said sample and said saturation threshold voltage;
a memory register connected to said column buffer to store and transmit information related to the comparison of said pixel output signals and said saturation threshold voltage;
a horizontal scanner interfaced with said column buffer, said horizontal scanner comprising a column read pointer; and
a logic circuit associated with each of said pixels, said logic circuit connected to receive at least three inputs, said inputs comprising said conditional reset signal, a reset enable signal from said evaluation read pointer, and a row reset signal from said row read pointer, said logic circuit connected to produce an output in response to said inputs, said output determining whether each of said respective pixels is reset.

31. The imaging device of claim 30, further comprising:
a timing and control circuit connected to said vertical scanner, said horizontal scanner and said column buffer to synchronize operations.

32. The imaging device of claim 30, further comprising:
a bias generator connected to provide bias signals to components of the imaging device.

33. The imaging device of claim 30, wherein said pixel output signals comprise an integrated signal having a slope that is proportional to the intensity of said stimulus.

34. The imaging device of claim 30, said column buffer further comprising a comparison circuit connected to accept at least first and second data samples from each of said pixel output signals during an integration period and to selectively trigger said conditional reset signal based on a comparison of said first data sample and said saturation threshold voltage.

35. The imaging device of claim 34, wherein said conditional reset signal is triggered when the value of said first data sample is greater than or equal to said saturation threshold voltage.

36. The imaging device of claim 34, wherein said conditional reset signal is triggered when the value of said first data sample is less than or equal to said saturation threshold voltage.

37. The imaging device of claim 30, further comprising:
an output interface circuit including a gain circuit connected to selectively provide gain to said pixel output signals that have been reset.

38. The imaging device of claim 30, further comprising:
an analog-to-digital (ADC) converter connected to convert analog output from said column buffer to a digital output signal.

39. The imaging device of claim 38, wherein said ADC converter is disposed on-chip.

40. The imaging device of claim 30, said logic circuit comprising a multiplexing (mux) element connected to allow said imaging device to operate in a row reset mode or an x-y selectable reset mode.

41. The imaging device of claim 40, said mux element comprising three field effect transistors (FETs) connected to function as a logic AND gate and to perform an additional implicit OR function.

42. The imaging device of claim 30, further comprising:
at least first and second buses connecting each column of said pixel array to said column buffer.

43. The imaging device of claim 42, wherein said first bus transmits data from one of said pixels to said column buffer in response to a signal from said evaluation read pointer, and wherein said second bus transmits data from one of said pixels to said column buffer in response to a signal from said row read pointer.

* * * * *